No. 632,012. Patented Aug. 29, 1899.
H. GREEN.
HAY RAKE.
(Application filed Mar. 21, 1898.)

(No Model.) 2 Sheets—Sheet 1.

Witnesses.

Inventor.
Henry Green
By I. M. Thurlow
Atty.

No. 632,012. Patented Aug. 29, 1899.
H. GREEN.
HAY RAKE.
(Application filed Mar. 21, 1898.)

(No Model.) 2 Sheets—Sheet 2.

Witnesses.

Inventor.
Henry Green
By L. M. Thurlow
Atty.

UNITED STATES PATENT OFFICE.

HENRY GREEN, OF PEKIN, ILLINOIS, ASSIGNOR TO THE ACME HARVESTER COMPANY, OF SAME PLACE.

HAY-RAKE.

SPECIFICATION forming part of Letters Patent No. 632,012, dated August 29, 1899.

Application filed March 21, 1898. Serial No. 674,563. (No model.)

*To all whom it may concern:*

Be it known that I, HENRY GREEN, a citizen of the United States, residing at Pekin, in the county of Tazewell and State of Illinois, have invented certain new and useful Improvements in Hay-Rakes; and I do hereby declare that the following is a full, clear, and exact description of the invention, which will enable others skilled in the art to which it appertains to make and use the same.

This invention relates to improvements in stripper or cleaner attachments for horse hay-rakes and an improved stop mechanism for limiting the movement of the lever used for operating the rake-teeth.

My first object is to provide a cleaner whose teeth or fingers will occupy at all times a fixed relation to the curve of the rake-teeth irrespective of the position occupied by the latter, whether raised or lowered or intermediate of those places. The relation between the cleaner-fingers and the rake-teeth is such that an obtuse angle, or at least an angle equal to or greater than a right angle, will be maintained between the rear surfaces of the cleaner-fingers and the rake-teeth, so that at no time can the hay, either while being gathered or delivered, be held by the shearing action of the members described, as has been the experience heretofore in machines of this class.

Secondly, my object is to provide a rigid stop on the rake-frame at the point of connection of the operating-lever with its auxiliary link pivoted to the rake-head. More properly speaking, I place a stop or contact piece for receiving the thrust of the lever upon the rake-frame immediately opposite the joint in the lever.

I am aware that it is not new to provide a stripper or cleaner for rakes; but it is new to provide an arrangement for accomplishing the object first above mentioned. I am also apprised of the fact that a stop for lever adjustment in a rake is not new; but locating such a device upon the rake-frame in a rigid manner just at the point of connection of the lever with its link or rake-head connection is new, and since the art does not disclose these devices, either separately or combined, I herein clearly set them forth, reserving the right, however, to change the location of the parts and to alter the construction without departing from the spirit of the invention when so doing.

Figure 1:
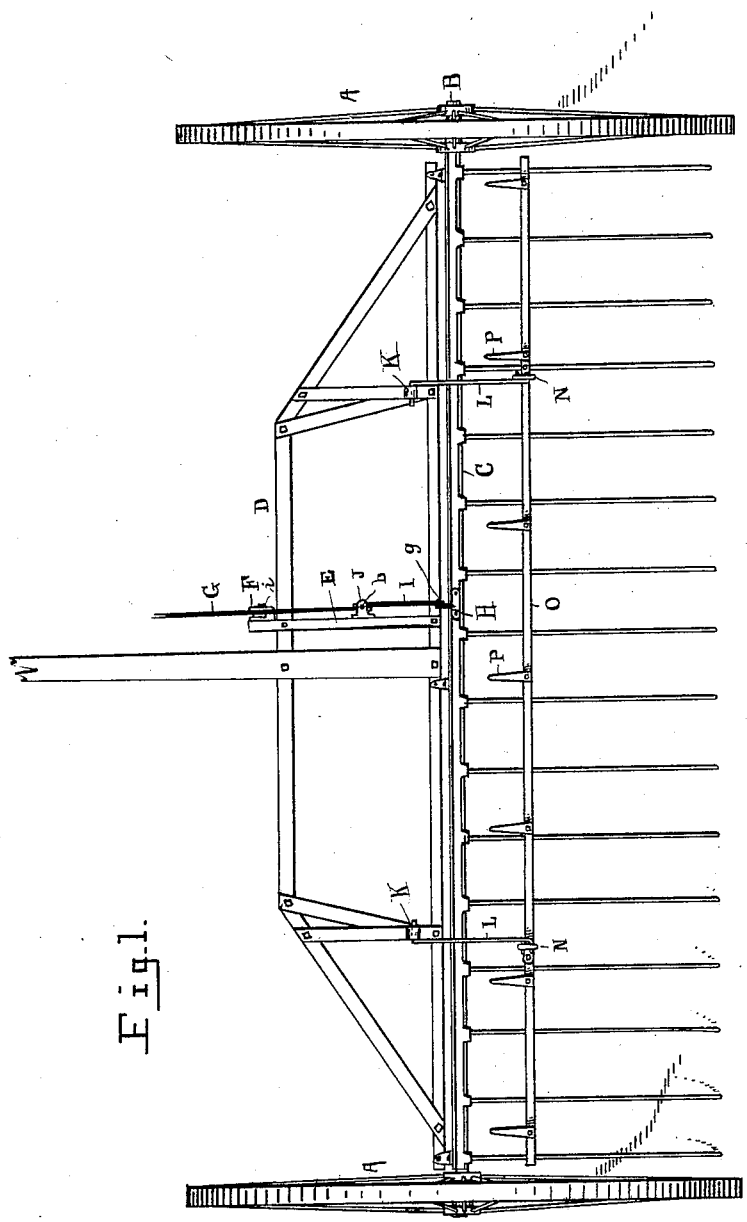
Figure 2:
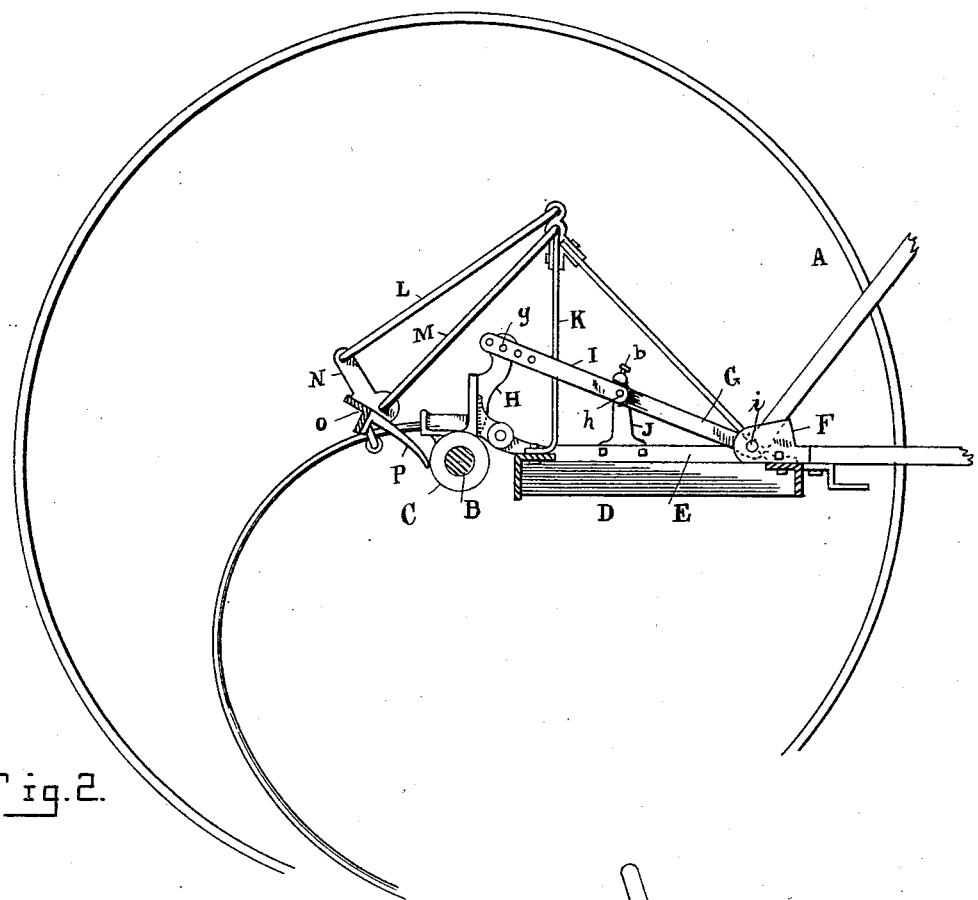
Figure 3:
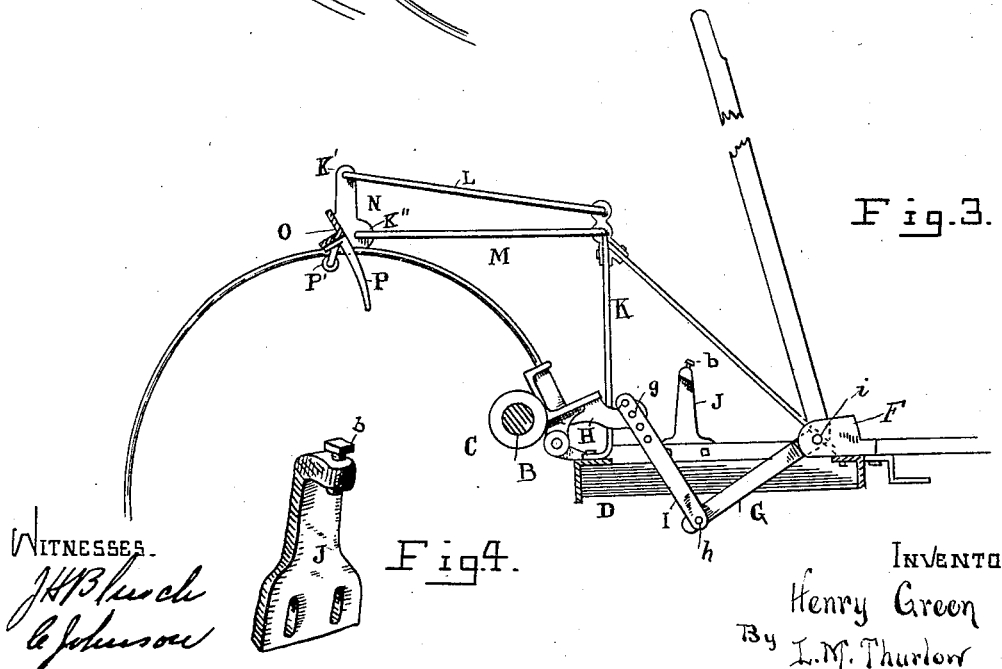
Figure 4:

In the appended drawings, Figure 1 is a plan view of a hay-rake, showing my cleaner-bar and connections for the same and the stop controlling the operating-lever. Fig. 2 is a side view of the rake, showing my improvements and their relative positions. Fig. 3 is also a side view of the machine, showing it in the dumping position. Fig. 4 is a perspective view of a form of stop used in controlling the lever.

After locating the various principal parts of the rake I will first describe my improved stop device.

A A are the carrying-wheels; B, the shaft; C, the usual rolling rake-head, and D the rake or draft frame. E is a supporting-bar, secured to the draft-frame at right angles to the carrying-shaft, and F is a slotted housing secured to the outer end of said supporting-bar E and pivotally supports the lever G, all common to hay-rakes. To the rolling rake-head C is secured the usual arm H, and a rod or link I pivotally connects the said arm H with the lever G referred to. This is likewise ordinarily employed in this class of implements.

My improvements may be understood by referring to Figs. 2 and 3, in which a "stop" J, as I term it, is erected upon the supporting-bar E immediately above the juncture of the link I and lever G in such manner that when the pivotal point of the portions named pass upward to or slightly beyond a straight line drawn between the fulcrums $g$ and $i$ it is arrested by said stop J. An adjusting-screw $b$ may be used in the top of the stop and permits any adjustment desired.

A stop of one form or another for limiting the movement of the operating-lever has been used before, but it has usually consisted in placing a screw at the juncture of the lever and link and held by one of those members or by placing a screw beneath the heel of the lever. Still other methods have been employed, but none of them show or use a stop device such as is described herein and none of them accomplish the objects I seek. The casting or forging composing the stop is secured on the frame without any preliminary work. Its proper position is assured and the lever bears up against it when raking is in progress by reason of the weight of the hand or foot upon such lever. However, the stop need not necessarily be adjusted by the use of the set-screw shown and described. As before stated, the casting will be sufficient in itself for correct position of the lever-joint, and, in fact, in most cases the flat surface of the stop will answer every purpose. Set-screws used by the devices referred to are likely to damage the part which bears upon them and render them unfit for use by the continual thrusting or pounding action necessarily set up, while in my device a solid face is met when the top is used without the screw each time the lever is locked after delivery of hay. The advantageous position for the stop is as far away from the lever-fulcrum as possible as well as from the point of connection between the link and rake-head and at the same time as near the connecting point of the lever and link as possible, because a slight difference in adjustment at such a point due to differences in castings or forgings or to chance differences in location of bolt-holes will not effect the relative locking position of the lever parts; but a very slight change in adjustment of parts near the fulcrum will cause a wide change in the proper locking position of such lever. Consequently the proper position of the stop is at the point of connection of the two parts as I show them, and this would be true wherever the point of connection is placed. The stop used as described prevents all jarring or straining of the parts caused by the pressure of hay against the teeth. When using a stop beneath the heel of the lever, much strain is imposed on the lever by reason of the distance between the rake-head and the lever-fulcrum; but this is entirely absent in my device, as will be evident to all familiar with such machines.

Attention is now drawn to my improved cleaner or stripper mechanism, readily understood by referring to the various figures, in which I employ at or near each end of the draft-frame a support or bracket. At the upper end of each bracket are two eyes K' and K'', in which are respectively pivoted the ends of two rods L and M, whose opposite ends have pivotal connection with a cleaner-bar O by means of the projections or arms N. This cleaner-bar occupies the entire length of the machine and lies upon the teeth at right angles to the length or parallel with the shaft B. A number of fingers P are secured to the bar O and project downward between the teeth substantially as shown in Fig. 2. A number of rollers P' are secured to the under side of the said bar to serve as guides for the teeth as well as to reduce friction. It is immaterial in what position the brackets K are placed with reference to the length of the rake or how many of them are employed. The particular construction thereof is also a matter of slight moment. The idea is to provide any good means for supporting the said rods L and M. Furthermore, the cleaner-bar need not extend the full length of the rake or be in one part, but may be divided into two or more sections, if desired, as the result will be the same in any case. The rollers for the teeth are not a necessity and I may leave them off altogether. It is to be observed that the rear ends of the rods L M are spread somewhat more than at the forward ends. This is in order to cause the fingers or teeth of the cleaner-bar to maintain the same relative position to the rake-teeth at all times. Referring to Figs. 2 and 3, the teeth P of the cleaner and the rake-teeth form an obtuse angle in both positions. This can only be accomplished by loosely attaching the cleaner to the said rods L and M. In all of the old forms known to me the cleaner-bar is attached rigidly to a single rod, the equivalent of those mentioned above, and when the rake-teeth rise the cleaner-fingers must of course rise as well, but pass from an obtuse angle to an acute angle with a shearing action as the limit of the rise is attained and the hay is pinched and held in the acute angle thus formed. My device accomplishes the opposite result—that is to say, the obtuse angle is held during the entire dumping or discharging action, keeping the acute angle in front of the fingers rather than behind them. It will be noted that this result is obtained by reason of the peculiar position of the rods with relation to each other and to the supports K and arms N. Placing the rods farther apart at their rear ends causes the fingers P to retain such a position with reference to the rake-teeth as to form the obtuse angle before mentioned. If the arm N were rigidly connected to either of the arms L M, an acute angle would at once result, as in the old forms. In moving up and down the said arm N moves on the pivotal ends of the arms, as is evident. Elevating the rake-teeth raises the bar O in an arc of a circle, resulting in a sweeping motion of the fingers P from the root of said rake-teeth to a position toward the points thereof sufficient to carry the hay to where it will readily drop freely to the ground. The said fingers in no manner retard this action, but rather assist it.

Various changes may be effected in constructing the cleaner-bar mechanism without departing from the spirit of my invention. Both the stop device and cleaner-bar arrangement may be applied to any style of rake.

Having made these points of advantage clear, as well as the construction for gaining them, I will proceed to my claims upon which I desire to secure protection.

I claim—

1. In a rake, the combination with the frame, the rake-head pivoted thereto and carrying the usual curved teeth, and a lever for swinging said head on its pivot; of a plurality of brackets rising from the frame and each having near its upper end two eyes one above the other, two rods independently pivoted at their front ends in said eyes and diverging toward their rear ends, cleaner-fingers projecting through said rake-teeth, and pivoted connections between the rear ends of said rods and such cleaner-fingers whereby the rear faces of the latter always stand at an obtuse angle to the teeth at the points where they cross them, as and for the purpose set forth.

2. In a rake, the combination with the frame D, the rake-head C pivoted thereto and carrying the usual teeth, and a lever G for swinging said head on its pivot; of a plurality of brackets K rising from the frame and each having near its upper end two eyes K', K" one above the other, two rods L, M independently pivoted at their front ends in said eyes and diverging toward their rear ends, a cleaner-bar O extending across the teeth and having projections N rising from it and cleaner-fingers P depending from it between the teeth, rollers P' on said bar engaging certain of the teeth, and pivotal connections between the rear ends of the uppermost of the rods and said projection and the rear ends of the lowermost of the rods and said bar whereby the rear faces of the fingers always stand at an obtuse angle to the teeth at the points where they cross them, as and for the purpose set forth.

3. In a rake, the rake-head, rake-teeth, the rake-frame supporting the said rake-head, a lever on the frame for operating the teeth, a stripper or cleaner bar lying across the rake-teeth, fingers on the cleaner-bar projecting between the rake-teeth into the basket formed by the teeth, supports on the rake-frame, links or rods pivoted to said supports in close relation to one another, diverging therefrom and having pivotal connection with the said cleaner-bar at the separated extremities substantially as and for the purposes set forth and described.

4. In a rake, the rake-head, rake-teeth, the rake-frame supporting the said rake-head, a lever on the frame, a link or connection pivoted to the lever and rake-head, a rigid stop secured to the rake-frame adapted to receive the upward thrust of the lever and link at their points of connection as set forth, in combination with a stripper-bar lying across the rake-teeth, fingers on the said bar projecting between the teeth, supports on the frame, links or rods pivoted to said support in close relation to one another, diverging therefrom and having pivotal connection with said cleaner-bar at the separated extremities substantially as set forth and for the purposes described.

5. In a rake, the rake-frame, the rake-head, teeth therefor, a stripper-bar lying across the teeth, fingers on the bar, supports or standards on the frame arising to a point near the rising limit of the rake-teeth, links or rods pivotally attached to the supports and the stripper-bar, said links or rods being farther apart at the stripper-bar end than at the other, whereby the fingers and the rake-teeth together are made to form an angle equal to or greater than a right angle in whatever position the rake-teeth may occupy for the purposes described.

In testimony whereof I affix my signature in presence of two witnesses.

HENRY GREEN.

Witnesses:
W. H. BINNIAN,
JAS. H. FITZMAURICE.